G. W. MOORE.
Turning Gage.
No. 94,968.  Patented Sept. 21, 1869.
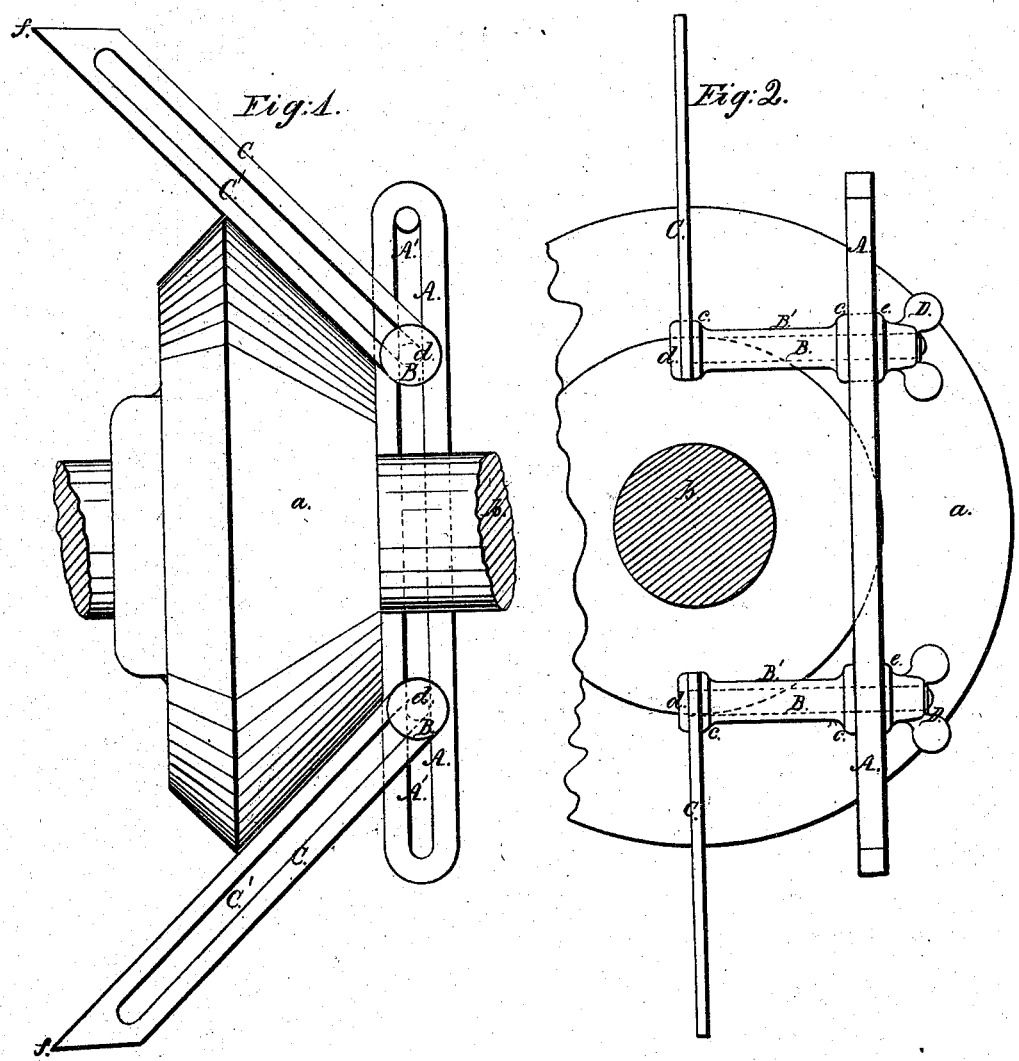
Witnesses:
H. A. White
J. A. Titus
Inventor:
George W. Moore

United States Patent Office.

GEORGE W. MOORE, OF WORCESTER, MASSACHUSETTS.

Letters Patent No. 94,968, dated September 21, 1869.

IMPROVED GAUGE FOR TURNING BEVELS.

The Schedule referred to in these Letters Patent and making part of the same.

*To all whom it may concern:*

Be it known that I, GEORGE W. MOORE, of the city and county of Worcester, and Commonwealth of Massachusetts, have invented certain new and useful Improvements in Gauges for Turning Bevels; and I do hereby declare that the following is a full, clear, and exact description of the same, reference being had to the accompanying drawings, and to the letters of reference marked thereon, forming a part of this specification, in which—

Figure 1 represents a side view of my improved gauge applied to use.

Figure 2 represents a transverse or edge view of my improved gauge applied to use.

To enable those skilled in the art to which my invention belongs, to make and use my improved gauge for turning bevels, I will proceed to describe it more in detail.

In the drawings, the part marked A represents the beam with the opening A' to receive the bolts B B.

B B represent the two bolts, which serve to carry the blade C C from the beam over the centre of the arbor.

They are made with flat heads, d d, for holding the blades C C firmly against the shoulders c c of the bushings B' B', through which the bolts B B pass, as indicated in the drawings.

D D represent thumb-nuts, which are screwed on to the ends of the bolts B B, for holding the parts of the gauge firmly together.

C C represent blades, with openings C' C', which allow of the blades being adjusted back and forth, and also turned on the bolts B B, for producing a greater or less angle to suit the bevel to be turned.

e e represent two washers, between the thumb-nuts D D and the beam A.

The bolts may be made with square shoulders where they pass through the slots C', if preferred.

Having described the different parts of my improved gauge, I will proceed to illustrate its use in practice.

a, in the drawings, represents a blank for a bevel-gear in process of being turned upon the arbor b.

To ascertain if the desired bevel is secured without removing the blank from the arbor, I first adjust my gauge to the proper angle, by placing the blades C C on the draught, and having secured the angle accurately, I turn up the thumb-nuts D D, thereby fixing the blades in immovable position. I then take the beam A, and carry it behind the arbor b, with the blades C C toward me.

The bushings and bolts B B' allow the blades to be brought over the centre of the arbor, as represented in fig. 2 of the drawings, when the gauge will at once indicate whether or not the proper bevel has been turned upon the blank.

The gauge may be constructed of any size, and if I wish to gauge a very small blank with a gauge of the size represented in the drawings, I slide the bolts toward the ends of the beam A, and turn the blades C C, so that their points f f will approach or nearly touch each other, and then carry the beam A to the opposite side of the blank a.

The gauge may be used to gauge inside surfaces as well as outside.

By having the outer corners of the gauge-blades cut off bevelling, so as to form one acute and one obtuse angle on the end of each gauge-blade, as fully shown in fig. 1 of the drawing, small inside bevels, in tubes or other articles, can be gauged in a very convenient and accurate manner.

In conclusion, I would observe that the main feature of my invention consists in so constructing the gauge, that the gauge-blades, though held in position by the beam, can be applied accurately to the centre or diameter of the blank bevel without necessitating the removal of the latter from the arbor on which it is mounted.

This result is produced by suspending the blades from and making them capable of being adjusted and secured upon bolts or standards, which project some distance from and can themselves be adjusted and secured at any desired point on the beam A, thus removing the latter from the gauge-blades, and keeping it out of the way of the arbor when the blades are applied to the blank bevel.

While I prefer the employment of bushings B', with the bolts or standards B, on account of the simplicity of the construction and arrangement of the parts, and the ease with which both the bolts and the blades can be adjusted, and then held in position by use of a single thumb-nut with each set, yet it is manifest that other arrangements can be made for effecting the same results.

The bushing can be dispensed with, and the standard held to the beam by one nut at the top, and the blade held to the standard by another nut at the other end of the standard; and other obvious modifications might also be made without departing from the principle of my invention as above stated.

Having described my improved gauge for turning bevels,

What I claim therein as new, and of my invention, and desire to secure by Letters Patent, is—

1. A blank bevel-gauging device, composed of the beam A, the projecting bolts or standards B, secured to and adjustable upon said beam, and the gauge-blades C, adjustable upon and secured to said bolts or standards, and having their outer ends either obliquely cut, for the purpose stated, or not, as preferred, the parts being arranged substantially as described, so that the gauging-blades can be applied to the centre of the blank bevel, without necessitating the removal of the latter from the arbor, on which it is mounted, as herein set forth.

2. The combination, with the slotted supporting beam A, of the slotted gauging-blades C C, bushings B' B', and bolts B B, together with means, substantially such as herein described, for tightening said bolts and holding said gauging-blades in the desired position, substantially as and for the purposes set forth.

GEO. W. MOORE.

Witnesses:
THOS. H. DODGE,
ALBERT E. PEIRCE.